United States Patent

[11] 3,584,664

| [72] | Inventors | Bo Holmberg;<br>Nils Erik Hellström, both of Nyland, Sweden |
|---|---|---|
| [21] | Appl. No. | 796,789 |
| [22] | Filed | Feb. 5, 1969 |
| [45] | Patented | June 15, 1971 |
| [73] | Assignee | Aktiebolaget Hammars Mekaniska Verkstad<br>Nyland, Sweden |

[54] APPARATUS FOR LENGTH ADJUSTING OR END TRIMMING MACHINES FOR USE IN SAW MILLS OR LIKE INSTALLATIONS
4 Claims, 3 Drawing Figs.

[52] U.S. Cl. ........................................... 143/41, 83/433, 143/46
[51] Int. Cl. ............................................. B27b 5/28
[50] Field of Search ................................. 143/41, 41.2, 41.5, 46, 46.55; 83/433, 482, 490, 470

[56] References Cited
UNITED STATES PATENTS

| 1,279,721 | 9/1918 | Lieber | 143/41 X |
| 2,393,617 | 1/1946 | De Spain | 143/41 X |
| 2,881,811 | 4/1959 | Haumann | 143/41 X |

Primary Examiner—Andrew R. Juhasz
Assistant Examiner—James F. Coan
Attorney—Holman & Stern ABSTRACT: An apparatus for length adjusting or end trimming machines in saw mills or like installations in which any of a plurality of normally passive trimming components may be activated selectively to trim a board or piece of lumber fed towards the trimming components via transverse conveying means with the apparatus being particularly suitable for length trimming machines wherein a trimmer inspects the material arriving on the conveying means and actuates means for determining the eventual cutting of the material.

INVENTORS,
BO HOLMBERG,
NILS ERIK HELLSTRÖM

APPARATUS FOR LENGTH ADJUSTING OR END TRIMMING MACHINES FOR USE IN SAW MILLS OR LIKE INSTALLATIONS

BACKGROUND OF THE INVENTION

The present invention relates to apparatus for trimming lumber pieces or the like introduced to the apparatus via transverse conveying means and which include means for energizing selectively at least one trimming component for the lumber.

It is known to control the trimming components by eccentric means, pneumatic or hydraulic cylinder and piston assemblages or the like.

A salient object of the present invention is to provide an apparatus in which a single power source serves any one of a plurality of parallel trimming components.

SUMMARY OF INVENTION

The present apparatus comprises a plurality of trimming components for lumber or the like in which the trimming components are arranged on pivotable carrying means so that gravity at least in part effects a lowering of the trimming components such as to engage the lumber with the carrying means being maintained in a passive upper position via electrically releasable retaining means and the trimming components are actuated by means for raising the carrying means against the effective gravity as well as lowering the carrying means with such last-mentioned means being disposed to operate in synchronization with the conveying means which introduces or feeds the lumber or the like beneath the trimming components.

DETAILED DESCRIPTION OF THE INVENTION

Figure 1:
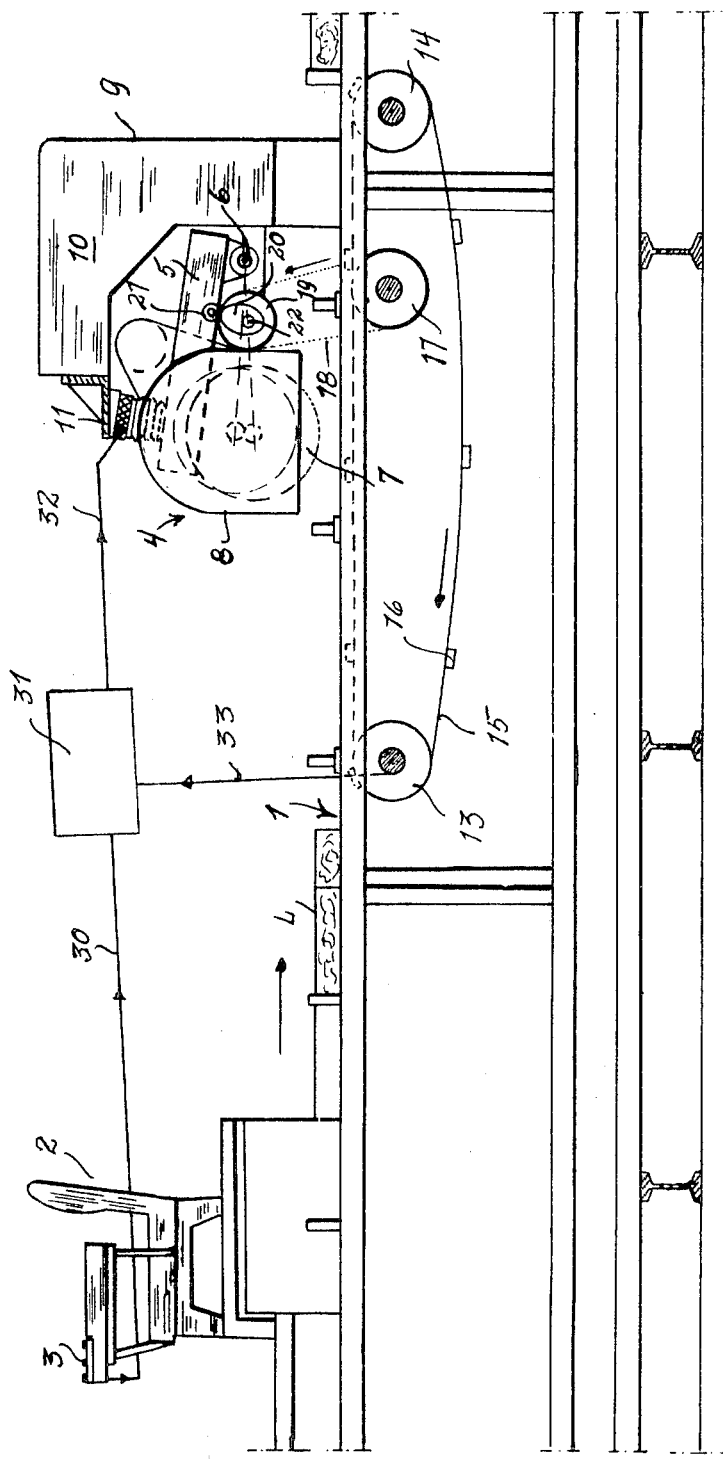
FIG. 1 is a view in elevation and partly in cross section of a part of a length adjusting machine provided with selectively releasable trimming components according to the invention.
Figure 2:
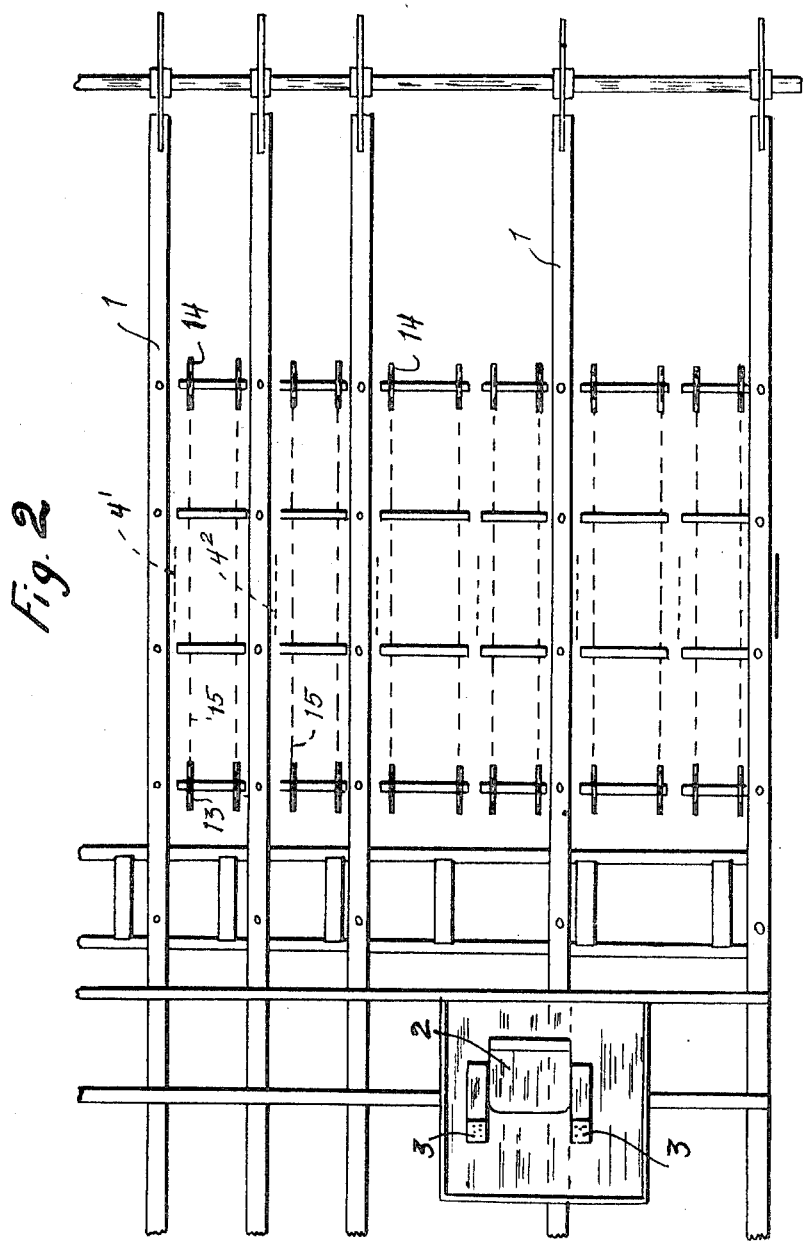
FIG. 2 is a top plan view of the machine illustrated in FIG. 1.

With reference to FIGS. 1 and 2, it will be noted that a conveyor 1 is disposed to transport pieces of lumber or the like denoted L below an inspection zone 2 at which a trimmer may inspect the lumber and operate a keyboard 3 for indicating the desired length of each lumber piece which passes the inspection table. Signals from the keyboard 3 are transmitted via electrical conductors 30 to a control and memory unit 31 in which such signals are stored temporarily. The output from the control and memory unit 31 is controlled via a synchronization conductor 33 and such output appears at appropriate times on output conductors 32 as will later be more fully described. Trimming components generally denoted 4 include a carrying arm or support 5 which together with a plurality of carrying arms are pivoted on a common shaft 6 which extends transversely with respect to the conveyor 1. These components also include a rotatable saw 7 which is disposed within a protective cover 8 and equipped with driving means (not shown) in a fashion which is known per se.

A sturdy framework 9 is equipped with bearings for the shaft 6 together with an upper angular portion 10 to which a plurality of electromagnets 11 are suitably affixed. It will be understood that at least one magnet 11 is provided for each trimming component 4.

The conveyor 1 coacts with a continuously driven conveyor 12 which is disposed to transport or move the material to be cut beneath the trimming components 4 in a precise fashion. The conveyor 12 may include two axially spaced sprocket wheels 13 and 14 and a chain 15 is trained about such sprocket wheels as clearly illustrated in FIGS. 1 and 2. The chain 15 is also equipped with dogs or the like 16 for cooperation with the lumber pieces. The chain 15 drives an additional wheel 17 and a chain 18 is trained about the wheel 17 and a wheel 19 disposed on shaft 22 journaled in the frame work 9. A curved plate or cam 20 is fixed to the shaft 22 and coacts with a cam follower 21 journaled in the arm or support 5.

As above-mentioned, a plurality of trimming components 4 are provided and such components are arranged in side-by-side relationship. Their respective cutting lines are denoted $4^1$, $4^2$ in FIG. 2. The rotatable saws 7 of the respective trimming components are in parallel relationship and are located at predetermined distances apart. By energizing one or two selected trimming components when a lumber piece passes therebeneath, the lumber piece may be cut to the desired length corresponding to the distance between the free end of the lumber piece and the selected trimming component or the distance between two selected trimming members, respectively.

It should be stressed that the lumber is transported or moved perpendicularly to the plane of the rotatable saws. Hence, the trimmer inspects the lumber arriving on the conveyor 1 and determines which length should be imparted to the different lumber pieces. The keyboard 3 is preferably equipped with one key for each trimming component 4 and the trimmer may then select one or two keys for each lumber piece to be cut so as to obtain the desired length for each piece. The signals from the keyboard 3 are stored temporarily in the control and memory unit 31 in order to be used automatically when the respective lumber piece reaches the trimming components.

While the operation of the apparatus is believed to be apparent from the foregoing, it may be summarized as follows: When a lumber piece approaches the cutting elements, the curved plate or cam 20 is in the angular position illustrated by full lines in FIG. 3 thereby retaining or maintaining the carrying means or supports 5 in their upper passive position. In the passive position, the carrying means are also retained by the activated electromagnets 11 and immediately prior to the respective lumber piece arriving below the cutting means, a signal is automatically transmitted via synchronization conductor 33 to the control and memory unit 31 thereby causing such unit to effect an output signal on the conductor 32 with this latter signal causing a deenergization of one or more of the electromagnets 11 corresponding to the desired length to be imparted to the respective lumber piece to be cut. As the lumber piece advances on the conveyor 12, the curved plate or cam 20 will rotate in the manner illustrated in FIG. 3 with the cam follower 21 following the periphery of the cam with the radial distance decreasing and the arm 5 of the selected trimming component lowered in view of the fact that such component is no longer arrested in its movement by the holding action of the associated electromagnet 11. Manifestly, all of the remaining trimming components will be maintained in their raised position by the associated electromagnets 11 which are still energized.

Figure 3:
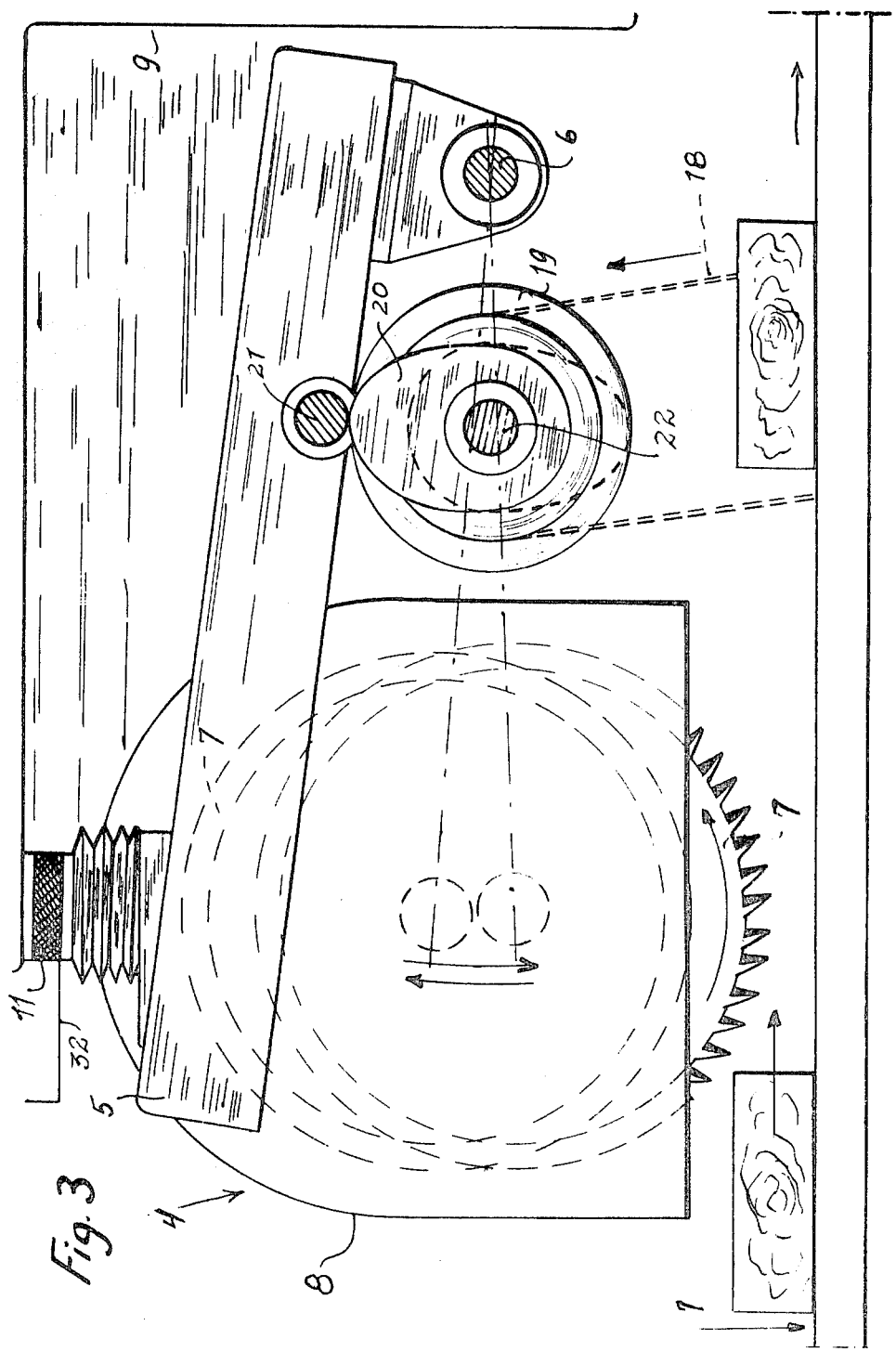
FIG. 3 is a view taken along line III–III of FIG. 1 of a cutting member in accordance with the invention, the view being on an enlarged scale.

The selected trimming component will, however, be lowered as illustrated in FIG. 3 and its angular position at each point is determined by the configuration of the curved plate or cam 20. The rotatable saw engages the lumber piece at a well constituted and controlled speed, which speed is determined by the speed of movement of the conveyor 12 and the configuration of the curved plate or cam 20. Hence, the present apparatus makes it possible to select the most effective feeding and cutting speeds. As the lumber piece advances or moves towards the right side of the assemblage as shown in FIG. 3, the saw will lower or drop successively deeper into the material until the saw completely cuts through the material. Upon the cutting operation being completed or terminated, the curved plate or cam 20 will have advanced approximately three-fourths of a revolution from its initial condition and the carrying means or support 5 started to elevate and eventually again be arrested by its associated electromagnet 11.

The foregoing cycle is repeated for the following lumber piece arriving on the conveyor.

It will be appreciated from the above that the present apparatus provides a simple and effective assemblage for successively trimming lumber pieces to predetermined desired lengths. The invention is not to be limited to the provision of one line of trimming components but two or more lines may be successively arranged with the rotatable saws staggered in a transverse direction for providing for example, twice as many possible lines of cutting across the conveyor thereby permitting the lumber to be cut to measure with twice as large a precision factor.

The above and other modifications will be obvious to persons skilled in the art and the foregoing description should not be construed to restrict the scope of the invention as defined in the annexed claims.

We claim:

1. An apparatus for trimming lumber pieces or the like, comprising a plurality of trimming components for the lumber pieces, transverse conveying means for feeding the lumber pieces to said plurality of trimming components, said trimming components being arranged in side-by-side relationship perpendicularly to the direction of travel of the conveying means, each trimming component including a rotatable saw, pivotable arm means on which each saw is mounted, said saws being parallel to each other and located at predetermined distances from each other, said pivotable arm means, under the influence of gravity, being capable of enabling said saws to at least partly descend and cut into the lumber pieces passing on the conveyor means, electrically releasable holding means for holding said trimming components in a passive elevated position, means for raising and lowering said pivotable arm means and said saws, said raising and lowering means being synchronized with said conveying means advancing said lumber pieces beneath said trimming components, a common shaft, a plurality of cams arranged on said common shaft with each cam being operably related to a rotatable saw, and a chain drive operably related to said conveying means and said shaft for driving said shaft in synchronization with the conveying means.

2. The apparatus for trimming lumber pieces as claimed in claim 1 including a keyboard, and means operably relating said keyboard to said trimming components for controlling said trimming components.

3. The apparatus for trimming lumber pieces as claimed in claim 2 including an intermediate memory device in which said signals are stored, with said memory device being arranged to supply output signals in synchronization with said conveyor means.

4. An apparatus for trimming lumber pieces or the like, comprising a plurality of selectively operable trimming components for the lumber pieces, transverse conveying means for feeding the lumber pieces, one by one, in a predetermined, spaced relationship under said trimming components, said trimming components being arranged in a side-by-side relationship perpendicular to the direction of travel of said conveying means, each of said trimming components including a rotatable saw, an arm, said saw being mounted at one end of said arm, means pivotally mounting the other end of said arm, said saws being parallel to each other and located at predetermined distances from each other, electrically releasable holding means for retaining, when energized, each rotatable saw in a passive, elevated position, said arm, under the influence of gravity, being capable of enabling the saw to at least partly descend and cut into lumber pieces passing under the trimming components on the conveying means, separate, electromagnetic holding means associated with each trimming component and adapted to retain said arm and rotatable saw in said passive, elevated position solely by electromagnetic attraction where said arm includes means adjacent its pivoted end constituting a portion of an electromagnetic circuit including a fixed electromagnet, means for feeding current to the electromagnet, means for selectively interrupting the current to at least one of the electromagnets in response to signals indicative of the length to which an arriving piece of lumber is to be cut, cam follower means is located on each arm between the ends thereof, a common shaft, a plurality of cams on said shaft with each cam being operably related to a cam follower for lowering the corresponding arm and rotatable saw into the cutting engagement with the passing lumber pieces upon the interruption of the current to the electromagnet corresponding to the arm or arms and for subsequently returning the arm or arms to the elevated position in which the same is retained by the electromagnet, and driving means operably connected between the conveyor means and the common shaft for driving the shaft in synchronization with the feeding rate of the conveying means.